United States Patent
Ryu et al.

(10) Patent No.: US 8,143,328 B2
(45) Date of Patent: Mar. 27, 2012

(54) METHACRYL RESIN COMPOSITION HAVING EXCELLENT IMPACT STRENGTH AND TRANSMITTANCY

(75) Inventors: Dong-jo Ryu, Daejeon (KR); Jeong-heon Ahn, Jeollanam-do (KR); Se-eun Lee, Seoul (KR)

(73) Assignee: LG Chem Ltd. (KR)

( * ) Notice: Subject to any disclaimer, the term of this patent is extended or adjusted under 35 U.S.C. 154(b) by 244 days.

(21) Appl. No.: 12/544,505

(22) Filed: Aug. 20, 2009

(65) Prior Publication Data
US 2010/0048816 A1    Feb. 25, 2010

(30) Foreign Application Priority Data
Aug. 22, 2008  (KR) .................. 10-2008-0082226

(51) Int. Cl.
*C08F 279/00* (2006.01)
*C08F 285/00* (2006.01)
*C08L 51/00* (2006.01)

(52) U.S. Cl. .............. 523/201; 525/71; 525/78; 525/74; 525/83; 525/85

(58) Field of Classification Search .................. 523/201; 525/71, 85, 74, 78, 83
See application file for complete search history.

(56) References Cited

U.S. PATENT DOCUMENTS
| | | | |
|---|---|---|---|
| 5,312,575 A * | 5/1994 | Wills | 264/109 |
| 2004/0063814 A1 * | 4/2004 | Miyatake et al. | 523/201 |

FOREIGN PATENT DOCUMENTS
| | | |
|---|---|---|
| JP | 10298371 A | 11/1998 |
| JP | 2006-131803 A | 5/2006 |
| KR | 10-0225268 B1 | 10/1999 |
| KR | 20080060740 A | 7/2008 |

* cited by examiner

*Primary Examiner* — Jeffrey Mullis
(74) *Attorney, Agent, or Firm* — Lerner, David, Littenberg, Krumholz & Mentlik, LLP

(57) ABSTRACT

The present invention relates to a methacryl resin composition having excellent impact strength and transmittancy, and more specifically, to a graft copolymer prepared by preparing graft prepolymer by inputting a monomer mixture comprising 60 to 100 wt % of alkyl methacrylate, and 0 to 40 wt % of one or more compound selected from a group consisting of aromatic vinyl compound and alkyl acrylate compound to perform graft polymerization and adding acid, salt, or polymer coagulant when the monomer conversion of the polymerization is 70% to 95% and then continuously performing the polymerization to have an increased particle size to 100 to 500 nm in a graft polymerization process among processes of preparing the graft polymer including a seed-rubber core-graft polymerization process, a preparing method thereof, and a methacryl resin composition including the graft polymer.

7 Claims, No Drawings

METHACRYL RESIN COMPOSITION HAVING EXCELLENT IMPACT STRENGTH AND TRANSMITTANCY

CROSS REFERENCE TO RELATED APPLICATION

The present application claims the benefit of Korean Application No. 10-2008-0082226, filed Aug. 22, 2008, the disclosure of which is hereby incorporated by reference herein.

TECHNICAL FIELD

The present invention relates to methacryl resin composition having excellent impact strength and transmittancy, and more specifically, to a graft polymer prepared by polymerizing a monomer mixture including 60 to 100 wt % of alkyl methacrylate, and 0 to 40 wt % of one or more compound selected from a group consisting of aromatic vinyl compound and alkyl acrylate compound to perform graft polymerization and adding acid, salt, or polymer coagulant when the monomer conversion of the polymerization is 70% to 95% and then continuously performing the polymerization to have an increased particle size to 100 to 500 nm, in a graft polymerization process among processes of preparing the graft polymer including a seed-rubber core-graft polymerization process, a preparing method thereof, and methacryl resin composition including the graft polymer.

BACKGROUND OF THE INVENTION

Methacryl resin has excellent transmittancy, weather resistance, hardness, chemical resistance, surface luster, adhesion, etc., and thus, has been widely used as a substitute for glass. However, since the methacryl resin has weaker impact resistance than other plastic materials, its thickness should be thick for use or its use has been limited.

In order to improve the impact resistance of the methacryl resin, there has been proposed a method of reforming methacryl resin using an impact reinforcing agent.

JP Laid-Open Patent No. 2006-131803 disclosed methacryl resin reformed by an impact reinforcing agent using acrylic rubber. The impact resistance of the methacryl resin is improved by the above method, which is insufficient. As a result, when a large amount of impact reinforcing agent is used in order to improve impact resistance, there is a problem in that the hardness and transmittancy of the methacryl resin is degraded.

SUMMARY OF THE INVENTION

In accordance with an embodiment of the present invention, a graft polymer includes:

(a) a seed comprising 1 to 30 parts by weight of the graft polymer, which is prepared by polymerizing a monomer mixture including 100 to 50 wt % of alkyl methacrylate, 0 to 50 wt % of one or more compound selected from a group consisting of alkyl acrylate, aromatic vinyl compound, and conjugated diene compound and 0 to 5 wt % of one or more graft agent and a crosslinking agent;

(b) a rubber core comprising 30 to 69 parts by weight of the graft polymer, which surrounds the seed and is prepared by polymerizing a monomer mixture including 60 to 95 wt % of alkyl acrylate, 5 to 40 wt % of one or more compound selected from a group consisting of alkyl methacrylate, aromatic vinyl compound, and conjugated diene compound and 0 to 5 wt % of one or more graft agent and crosslinking agent;

(c) a graft prepolymer comprising 1 to 35 parts by weight of the graft polymer, which surrounds the rubber core and is prepared by polymerizing a monomer mixture including 60 to 100 wt % of alkyl methacrylate, and 0 to 40 wt % of one or more compound selected from a group consisting of aromatic vinyl compound and alkyl acrylate compound, to perform graft polymerization and adding acid, salt, or polymer coagulant when the monomer conversion of the polymerization is 70% to 95%, and continuously performing the polymerization to have an increased particle size to 100 to 500 nm; and.

(d) a graft polymer comprising 1 to 35 parts by weight of the graft polymer, which surrounds the graft prepolymer and is prepared by polymerizing a monomer mixture including 60 to 100 wt % of alkyl methacrylate, and 0 to 40 wt % of one or more compound selected from a group consisting of aromatic vinyl compound and alkyl acrylate compound, provides a preparing method thereof.

Further, the present invention provides methacryl resin composition using the graft polymer in which an impact reinforcing agent is mixed.

DETAILED DESCRIPTION

Hereinafter, the present invention will be described in detail.

A graft polymer of the present invention is prepared by a method including:

(a) preparing a seed by polymerizing a monomer mixture including 100 to 50 wt % of alkyl methacrylate, 0 to 50 wt % of one or more compound selected from a group consisting of alkyl acrylate, aromatic vinyl compound, and conjugated diene compound and 0 to 5 wt % of one or more cross linking agent and a graft agent;

(b) preparing a rubber core surrounding the seed by polymerizing a monomer mixture including 60 to 95 wt % of alkyl acrylate, 5 to 40 wt % of one or more compound selected from a group consisting of alkyl methacrylate, aromatic vinyl compound, and conjugated diene compound and 0 to 5 wt % of one or more crosslinking agent and graft agent;

(c) preparing a pre-formed graft base polymer ("graft prepolymer") surrounding the rubber core by adding a monomer mixture including 60 to 100 wt % of alkyl methacrylate, and 0 to 40 wt % of one or more compound selected from a group consisting of aromatic vinyl compound and alkyl acrylate compound to perform graft polymerization and adding acid, salt, or polymer coagulant when the monomer conversion of the polymerization is 70% to 95% and then continuously performing the polymerization, to have an increased particle size of 100 to 500 nm; and (d) preparing a final graft base polymer ("graft polymer") surrounding the graft prepolymer by polymerizing a monomer mixture including 60 to 100 wt % of alkyl methacrylate, and 0 to 40 wt % of one or more compound selected from a group consisting of aromatic vinyl compound and alkyl acrylate compound.

The monomer ratio of each step according to the present invention is (a) 1 to 30 parts by weight of the seed, (b) 30 to 69 parts by weight of the rubber core, (c) 1 to 35 parts by weight of the graft prepolymer, and (d) 1 to 35 parts by weight of the graft polymer.

The (a) seed according to the present invention consists of 100 to 50 wt % of alkyl methacrylate, 0 to 50 wt % of one or more compound selected from a group consisting of alkyl acrylate, aromatic vinyl compound, and conjugated diene compound and 0 to 5 wt % of one or more crosslinking agent and graft agent.

As the alkyl methacrylate, methyl methacrylate, ethyl methacrylate, propyl methacrylate, n-butyl methacrylate, benzil methacrylate, phenyl methacrylate, lauryl methacrylate, stearyl methacrylate, etc, can be used.

As the alkyl acrylate where a carbon number of alkyl group is 1 to 8, specifically, methyl acrylate, ethyl acrylate, propyl acrylate, isopropyl acrylate, n-butyl acrylate, hexyl acrylate, octyl acrylate, 2-ethylhexyl acrylate, etc. can be used.

As the aromatic vinyl compound, styrene, α-methylstyrene, α-ethylstyrene, paramethylstyrene, acrylonitrile, methacrylonitrile, etc. can be used.

As the conjugated diene compound, 1,3-butadiene, 2-3-butadiene, isoprene, chloroprene, etc. can be used.

The crosslinking agent and graft agent is exemplified as ethylene glycol diacrylate, ethylene glycol dimethacrylate, 1,3-butylene glycol diacrylate, 1,3-butylene glycol dimethacrylate, 1,6-hexamethylene glycol dimethacrylate, divinylbenzene, allyl acrylate, allyl methacrylate, etc., but is not limited thereto.

The seed can be prepared by an emulsion polymerization method. At this time, emulsifier, initiator, ion exchanged water, etc. can be generally used in the emulsion polymerization.

Preferably, the average particle size of the seed is 50 to 150 nm.

Preferably, the refractive index of the seed is 1.480 to 1.500 in order to maintain transmittancy.

The (b) rubber core according to the present invention surrounds the (a) seed and consists of 60 to 95 wt % of alkyl acrylate, 5 to 40 wt % of one or more compound selected from a group consisting of alkyl methacrylate, aromatic vinyl compound, and conjugated diene compound and 0 to 5 wt % of one or more crosslinking agent and graft agent;

Preferably, the average particle size of the rubber core is 100 to 400 nm. There is a problem in that when the average particle size is less than 100 nm, the impact strength is degraded and when the average particle size is more than 400 nm, the transmittancy is degraded.

Preferably, the refractive index of the rubber core is 1.480 to 1.500 in order to maintain transmittancy.

The (c) graft prepolymer according to the present invention surrounds the (b) rubber core and consists of 60 to 100 wt % of alkyl methacrylate, and 0 to 40 wt % of one or more compound selected from a group consisting of aromatic vinyl compound and alkyl acrylate compound. Further, the present invention includes preparing the graft prepolymer by adding the monomer mixture to perform graft polymerization and adding acid, salt, or polymer coagulant when the monomer conversion of the polymerization is 70% to 95% and then continuously performing the polymerization to have an increased particle size to 100 to 500 nm.

According to the present invention, at step (c), when the monomer conversion of the polymerization is 70 to 95%, the acid, salt, or polymer coagulant is added to control the stability of the graft polymer, thereby increasing the particle size of the graft polymer.

At this time, it is preferable that the particle size is 100 to 500 nm in order to improve the impact resistance and minimize the degradation of transmittancy.

There is a problem in that when the particle size is less than 100 nm, the impact resistance is not improved and when the particle size is more than 500 nm, the transmittancy is degraded.

At step (c), as acid usable in order to increase the particle size of particle, sulphuric acid, hydrochloric acid, sulfonic acid, maleic acid, acetic acid, fumaric acid, itaconic acid, acrylic acid, methacrylic acid, carboxylic acid, propionic acid, crotonic acid, etc. can be used. These acids can be used alone or in a form of two or more mixing solution.

At step (c), as salt usable in order to increase the particle size of particle, compounds dissociated by ions such as $Na^+$, $K^+$, $Ca^{2+}$, $Al^{3+}$, $H^+$, etc. or $Cl^-$, $Br^-$, $SO_4^{2-}$, $SO_3^{2-}$, $NO_2^-$, $NO_3^-$, $PO_4^{3-}$, $CO_3^2$, $OH^-$, etc. can be used. These salts can be used alone or in a form of two or more mixing solution. The detailed example of these salts may include NaCl, KCl, $Na_2SO_4$, $CaCl_2$, $AlCl_3$, etc.

At step (c), as polymer coagulant usable in order to increase the particle size of particle, copolymer latex containing unsaturated acid having a carboxyl group can be used. An example of the monomer having carboxyl group may include acrylic acid, methacrylic acid, methyl acrylic acid, itaconic acid, crotonic acid, fumaric acid, maleic acid, etc. and it is preferable that the polymer coagulant is prepared by copolymerizing methylene unsaturated carboxylic acid and one or more monomer of acrylates monomer such as methylmethacrylate, methylacrylate, ethylacrylate, etc., conjugated double bonded monomer of $C_{4-6}$ such as butadiene, isoprene, etc., monovinyl aromatic hydrocarbon such as styrene, α-methylstyrene, vinyltoluene, chlorostyrene, etc., and acrylonitrile and methacrylonitrile monomer.

Preferably, the amount of additives used to increase the particle size, that is, acid, salt, or polymer coagulant is 0.01 to 10 parts by weight for every 100 parts by weight of the final graft polymer. There is a problem in that when the content is less than 0.01 parts by weight, the increase of the particle size is hard and when the content is larger than 10 parts by weight, a large amount of coagulation occurs.

Preferably, the refractive index of the graft prepolymer is 1.480 to 1.500 in order to maintain transmittancy.

The (d) graft polymer according to the present invention surrounds the (c) graft prepolymer and consists of 60 to 100 wt % of alkyl methacrylate, and 0 to 40 wt % of one or more compound selected from a group consisting of aromatic vinyl compound and alkyl acrylate compound.

Preferably, the average particle size of the graft polymer is 100 to 500 nm.

Preferably, the refractive index of the graft polymer is 1.480 to 1.500 in order to maintain transmittancy.

The methacryl resin composition is prepared using the mixture of the graft polymer prepared by the method and the impact reinforcing agent, thereby making it possible to maximize the impact resistance while minimizing the degradation of transmittancy.

EXAMPLES

Hereinafter, exemplary examples of the present invention will be described in more detail, but are exemplified to help the understanding of the present invention. Therefore, the present invention is not limited to the following examples.

Example 1

(a) Seed 100 parts by weight of ion exchanged water, 0.1 parts by weight of sodium lauryl sulfate, and 5 parts by weight of methyl methacrylate were added to a 5 L polymerization vessel in which an agitator and a condenser are mounted and the polymerization vessel was then increased to 70° C. When the internal temperature of the reactor reaches 70° C., 0.2 parts by weight of potassium persulfate was added therein and was subjected to the polymerization reaction, thereby obtaining a seed. At this time, the final monomer conversion of the polymerization was 98%, the final particle size was 60 nm, and the refractive index was 1.490.

(b) Rubber Core

A monomer mixture was prepared using 100 parts by weight of ion exchanged water, 0.2 parts by weight of sodium lauryl sulfate, 10 parts by weight of styrene, 39.5 parts by weight of butyl acrylate, and 0.5 parts by weight of allyl methacrylate and was then input in the seed for 2 hours. At this time, 0.1 parts by weight of potassium persulfate was simultaneously added therein and the polymerization reaction was performed, thereby completing the core polymerization. At this time, the final conversion ratio was 99%, the final particle size was 130 nm, and the refractive index was 1.490.

(c) Graft Prepolymer

After 0.01 parts by weight of ethylene diamine tetrasodium acetate, 0.006 parts by weight of ferrous sulfate, and 0.04 parts by weight of sodium formaldehyde sulfoxylate are input in the rubber core latex. A monomer mixture including 20 parts by weight of methyl methacrylate, 0.2 parts by weight of potassium oleate, 20 parts by weight of ion exchanged water and 0.08 parts by weight of t-butylperoxide were input therein for 10 minutes and they were subjected to the polymerization reaction at 60° C. for 1 hour. At this time, the monomer conversion of the polymerization was 80%. 0.2 parts by weight of sodium dioctylsulfosuccinate and 0.5 parts by weight of acetic acid were sequentially added therein, which were then polymerized for 1 hour to increase the particle size of the graft polymer to 250 nm. At this time, the refractive index was 1.490 and the monomer conversion of the polymerization was 99%.

(d) Graft Polymer

After 0.01 parts by weight of ethylene diamine tetrasodium acetate, 0.006 parts by weight of ferrous sulfate, and 0.04 parts by weight of sodium formaldehyde sulfoxylate are input in the graft prepolymer, a monomer mixture including 25 parts by weight of methyl methacrylate, 0.25 parts by weight of potassium oleate, 25 parts by weight of ion exchanged water and 0.1 parts by weight of t-butyl hydroperoxide were added in 10 minutes and they were subjected to the polymerization reaction at 60° C. for 2 hours. The particle size of the final polymer was 275 nm and the refractive index was 1.490. The final monomer conversion of the polymerization was 99%.

The final graft polymer prepared according to the foregoing was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Example 2

Example 2 performed the same polymerization as Example 1 except that 1.0 part by weight of sodium chloride was input at the step of preparing the graft prepolymer of Example 1 instead of 0.2 parts by weight of sodium dioctylsulfosuccinate and 0.5 parts by weight of acetic acid. At this time, the increased particle size of the (c) graft prepolymer was 250 nm.

The final graft polymer prepared according to Example 2 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Example 3

Preparation of Polymer Coagulant 180 parts by weight of ion exchanged water, 1.0 parts by weight of sodium lauryl sulfate as additives, 0.019 parts by weight of ethylene diamine tetrasodium acetate, 0.012 parts by weight of ferrous sulfate, and 0.08 parts by weight of sodium formaldehyde sulfoxylate were input in a 5 L polymerization vessel in which an agitator is mounted. At a first step, 23 parts by weight of butyl acrylate, 2 parts by weight of methyl methacrylate, 2 parts by weight of acrylic acid, 0.2 parts by weight of t-dodecyl mercaptan, and 0.03 parts by weight of cumenehydroperoxide were continuously input for two hours and polymerized at 70° C. and at a second step, when the monomer conversion of the polymerization of monomer is at least 90%, 25 parts by weight of butyl acrylate, 35 parts by weight of methyl methacrylate, 13 parts by weight of acrylic acid, 0.5 parts by weight of t-dodecyl mercaptan, and 0.1 parts by weight of cumenehydroperoxide were continuously input for 5 hours and polymerized at 70° C., thereby obtaining polymer coagulant having a particle size of 100 nm. At this time, the final conversion ratio thereof was 98%

Polymerization of Graft Polymer

Example 3 performed the same polymerization as Example 1 except that 0.5 parts by weight of polymer coagulant was input at the step of preparing the graft prepolymer of Example 1 instead of 0.2 parts by weight of sodium dioctylsulfosuccinate and 0.5 parts by weight of acetic acid. At this time, the increased particle size of the (c) graft prepolymer was 250 nm.

The prepared final graft polymer prepared according to Example 3 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Comparative Example 1

Comparative Example 1 performed the same polymerization as Example 1 except that of 0.2 parts by weight of sodium dioctylsulfosuccinate and 0.5 parts by weight of acetic acid were not input at the step of preparing the graft prepolymer of Example 1.

The final graft polymer prepared according to Comparative Example 1 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Comparative Example 2

Comparative Example 2 performed the same polymerization as Example 1 except that of 0.2 parts by weight of sodium dioctylsulfosuccinate and 0.5 parts by weight of acetic acid were not input at the step of preparing the graft prepolymer of Example 1 and were input when the rubber core step completes.

The final graft polymer prepared according to Comparative Example 2 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Example 4

Example 4 performed the same polymerization as Example 1 except that 0.2 parts by weight of sodium dioctylsulfosuccinate and 0.5 parts by weight of acetic acid were input in 45 minutes (conversion ratio 70%) after the reaction starts at the step of preparing the graft prepolymer of Example 1.

The final graft polymer prepared according to Example 4 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Example 5

Example 5 performed the same polymerization as Example 1 except that 0.2 parts by weight of sodium dioctylsulfosuccinate and 0.5 parts by weight of acetic acid were input in 90 minutes (conversion ratio 95%) after the reaction starts at the step of preparing the graft prepolymer of Example 1.

The final graft polymer prepared according to Example 5 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Comparative Example 3

Comparative Example 3 performed the same polymerization as Example 1 except that 0.2 parts by weight of sodium dioctylsulfosuccinate and 0.5 parts by weight of acetic acid were input in 30 minutes (conversion ratio 50%) after the reaction starts at the step of preparing the graft prepolymer of Example 1.

The final graft polymer prepared according to Comparative Example 3 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Comparative Example 4

Comparative Example 4 performed the same polymerization as Example 1 except that 0.2 parts by weight of sodium dioctylsulfosuccinate and 0.5 parts by weight of acetic acid were input in 2 hours (conversion ratio 99%) after the pregraft reaction completes at the step of preparing the graft prepolymer of Example 1.

The final graft polymer prepared according to Comparative Example 4 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Comparative Example 5

Comparative Example 5 performed the same polymerization as Example 1 except that of 0.2 parts by weight of sodium dioctylsulfosuccinate and 0.5 parts by weight of acetic acid were not input at the step of preparing the graft prepolymer of Example 1 and was instead input in 1 hour after the final graft reaction starts.

The final graft polymer prepared according to Comparative Example 5 was added with salt to separate from water and was then dehydrated and dried, thereby obtaining powders. 30 parts by weight of the graft polymer is mixed with 70 parts by weight of PMMA resin (HP-10 available from LG-MMA Co.) and the physical properties thereof were evaluated by extrusion and injection. The results are represented in the following Table 1.

Evaluation of Physical Properties

Impact Strength—Izod impact strength was measured based on ASTM D256 using a ⅛" sample.

Light Transmission Haze—it was measured based on ASTM D1003 using an injection molding product having a thickness of 3 mm.

TABLE 1

| Division | | Impact Strength (kg · cm/cm) | Haze | Light Transmission (%) |
|---|---|---|---|---|
| Examples | 1 | 4.7 | 1.3 | 91.3 |
| | 2 | 4.8 | 1.2 | 91.3 |
| | 3 | 4.6 | 1.4 | 90.9 |
| | 4 | 4.5 | 1.3 | 91.0 |
| | 5 | 4.5 | 1.2 | 91.4 |
| Comparative Examples | 1 | 2.7 | 3.2 | 89.1 |
| | 2 | 2.6 | 3.6 | 87.6 |
| | 3 | 2.9 | 3.5 | 87.5 |
| | 4 | 2.6 | 3.8 | 88.9 |
| | 5 | 2.9 | 3.4 | 89.2 |

As represented in Table 1, at the step of preparing the graft prepolymer, when the conversion ratio is 70% to 95%, it can be appreciated that Examples of increasing the particle size of particle have better impact resistance and transmittancy than Comparative Examples.

As described above, the graft polymer prepared by the preparing method of the present invention is used as the impact reinforcing agent for the methacryl resin, thereby making it possible to provide the methacryl resin composition having excellent impact strength and transmittancy.

Although the present invention described in detail with reference to the detailed example, it can be understood by those skilled in the art that various changes and modifications can be made within the scope and technical idea of the present invention. Thus, it is intended that the present invention covers the modifications and variations of this invention provided they come within the scope of the appended claims and their equivalents.

What is claimed is:

1. A method for preparing a graft copolymer comprising:
   (a) preparing a seed by polymerizing a monomer mixture including 50 to 100 percent by weight of alkyl methacrylate, 0 to 50 percent by weight of one or more compounds selected from the group consisting of alkyl acrylate, an aromatic vinyl compound, and a conjugated diene compound, and 0 to 5 percent by weight of one or more crosslinking agents and a graft agent, based on the total weight of the seed, wherein the seed is 1 to 30 percent by weight based on the total weight of the graft copolymer;
   (b) preparing a rubber core surrounding the seed by polymerizing 60 to 95 percent by weight of alkyl acrylate, 5 to 40 percent by weight of one or more compounds selected from the group consisting of alkyl methacrylate, an aromatic vinyl compound, and a conjugated diene compound, and 0 to 5 percent by weight of one or more crosslinking agents and a graft agent based on the total weight of the rubber core, wherein the rubber core is 30 to 69 percent by weight based on the total weight of the graft copolymer;
   (c) preparing a pre-formed graft base polymer surrounding the rubber core by polymerizing a monomer mixture including 60 to 100 percent by weight of alkyl methacrylate, and 0 to 40 percent by weight of one or more compounds selected from the group consisting of an aromatic vinyl compound and an alkyl acrylate compound, based on the total weight of the pre-formed graft base polymer, to perform graft polymerization and adding acid, salt, or polymer coagulant when the monomer conversion of the polymerization is 70% to 95% while continuously performing the polymerization to have an increased average particle size of 100 to 500 nm, wherein the pre-formed graft base polymer is 1 to 35 percent by weight based on the total weight of the graft copolymer; and
   (d) preparing a graft base polymer surrounding the pre-formed graft base polymer by polymerizing a monomer mixture including 60 to 100 percent by weight of alkyl methacrylate, and 0 to 40 percent by weight of one or more compounds selected from the group consisting of an aromatic vinyl compound and an alkyl acrylate compound based on the total weight of the graft base polymer, wherein the graft base polymer is 1 to 35 percent by weight of the total weight of the graft copolymer.

2. The method according to claim 1, wherein in the step (c) the amount of acid added is from 0.01 to 10 parts by weight for every 100 parts by weight of the final graft copolymer, the acid being one or more compounds selected from the group consisting of sulphuric acid, hydrochloric acid, sulfonic acid, maleic acid, acetic acid, fumaric acid, itaconic acid, acrylic acid, methacrylic acid, carboxylic acid, propionic acid and crotonic acid.

3. The method according to claim 1, wherein in the step (c) the amount of salt added is from 0.01 to 10 parts by weight for every 100 parts by weight of the final graft copolymer, the salt being one or more compounds dissociated by one or more ions selected from the group consisting of $Na^+$, $K^+$, $Ca^{2+}$, $Al^{3+}$, $H^+$, $Cl^-$, $Br^-$, $SO_4^{2-}$, $SO_3^{2-}$, $NO_2^-$, $NO_3^-$, $PO_4^{3-}$, $CO_3^{2-}$, and $OH^{31}$.

4. The method according to claim 1, wherein in the step (c) the amount of the polymer coagulant added is from 0.01 to 10 parts by weight for every 100 parts by weight of the final graft copolymer, the polymer coagulant being prepared by copolymerizing 1) a monomer having a carboxyl group selected from the group consisting of acrylic acid, methacrylic acid, methyl acrylic acid, itaconic acid, crotonic acid, fumaric acid, and maleic acid, and 2) one or more monomers selected from the group consisting of methyl methacrylate, conjugated double bonded monomer of $C_{4-6}$, a monovinyl aromatic hydrocarbon monomer, acrylonitrile and methacrylonitrile.

5. The method according to claim 1, wherein each refractive index of the seed prepared in step (a), the rubber core prepared in step (b), the pre-formed graft base polymer prepared in step (c), and the graft base polymer prepared in step (d) is from 1.480 to 1.500.

6. A graft copolymer prepared by the method according to claim 1.

7. A methacryl resin composition comprising the graft copolymer according to claim 6 and a methacryl resin.

* * * * *

UNITED STATES PATENT AND TRADEMARK OFFICE
CERTIFICATE OF CORRECTION

PATENT NO.         : 8,143,328 B2
APPLICATION NO.    : 12/544505
DATED              : March 27, 2012
INVENTOR(S)        : Dong-jo Ryu, Jeong-heon Ahn and Se-eun Lee Page 1 of 1

It is certified that error appears in the above-identified patent and that said Letters Patent is hereby corrected as shown below:

In the Claims

Claim 3, Column 10, line 20, "$OH^{31}$" should read -- $OH^-$ --.

Signed and Sealed this
Twenty-seventh Day of August, 2013

Teresa Stanek Rea
*Acting Director of the United States Patent and Trademark Office*